Patented Oct. 12, 1926.

1,602,991

UNITED STATES PATENT OFFICE.

HUGO SCHWEITZER, OF WIESDORF, NEAR COLOGNE, GERMANY, ASSIGNOR TO GRAS-SELLI DYESTUFF CORPORATION, OF NEW YORK, N. Y., A CORPORATION OF DELAWARE.

TRISAZO DYESTUFF.

No Drawing. Application filed June 1, 1925, Serial No. 34,173, and in Germany June 13, 1924.

I have invented new and useful improvements in greenish-blue trisazo dyestuffs and process of making same.

In trying to synthesize dyestuffs of the general formula

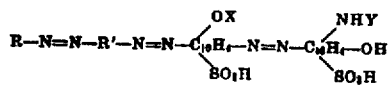

by diazotizing a disazo compound containing a 1-2-amino-naphtholether-sulfonic acid as end component and coupling with an aminonaphtholsulfonic acid compound, it was found that the coupling energy of the diazo compound is so reduced that in aqueous alkaline solution no combination takes place, but that the diazo compound decomposes readily.

I have now found that if tertiary organic nitrogeneous bases such as pyridines and their derivatives or homologues are added to the solution of a diazo compound obtained by diazotizing the amino group of a disazo compound containing an 1-2-amino-naphtholether-sulfonic acid as end component, the disazo compound becomes not only practically sufficiently stable, but the coupling with an aminonaphtholsulfonic acid compound proceeds rapidly and trisazo dyestuffs of the general formula

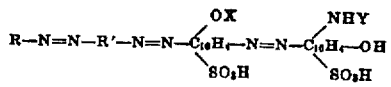

are obtained with good yields.

The amount of tertiary base required can be varied considerably without affecting the result described above. It is, however, preferred to use an excess over the amount equivalent to the free acidity of the coupling solution.

This process is particularly valuable for the preparation of dyestuffs in which the components R and R' in the above formula are amines or aminosulfonic acids of the benzene and naphthalene series, the 1-2-aminonaphtholether sulfonic acid the 1-2-6-isomer and I have further found the 2-5-7-aminonaphthol sulfonic acid or its amino-aryl substituted derivatives to be very suitable end components.

The alkali metal salts of my new dyestuffs of the type

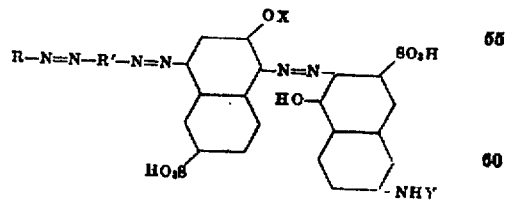

in which R and R' represent the radicles of aromatic amines or their sulfonic acids, X an alkyl and Y hydrogen or an aryl radicle, are generally dark powders, soluble in concentrated sulfuric acid with a blue color, soluble in water with from blue to green colors. By reduction with stannous chloride and hydrochloric acid they yield an aromatic amine, an aromatic diamine, a 2-6-diamino-5-naphthol-7-sulfonic acid compound and 1-4-diamino-naphtholether-6-sulfonic acid.

These new dystuffs dye cotton from blue to green exceedingly bright shades, distinguished by superior light fastness.

The following example will further illustrate my invention, the parts being by weight:—

25.3 parts aniline 3-6-disulfonic acid dissolved in 300 parts hot water, after cooling and addition of ice and 12 parts muriatic acid (commercial hydrochloric acid), diazotized at 10–15° C. This diazo solution is run at 20° C. into a solution of 17.9 parts alpha-naphthylamine hydrochloride in about 500 parts water. The coupling starts immediately and is finished after about 10 hours. The amino-azo solution is now run into 78 parts muriatic acid (commercial hydrochloric acid) and is diazotized by the addition of 6.9 parts sodium nitrite dissolved in 70 parts water. The diazo compound being soluble, is salted out with 250 parts common salt, filtered on a vacuum filter, washed with a saturated sodium chloride solution and added to an ice-cold suspension of 26.7 parts 1-amino-2-naphtholethylether-6-sulfonic acid in about 300 parts water. The coupling proceeds again readily and the disazo compound separates to a large extent. 6.5 parts caustic soda (38° Bé.) are now added, which produces clear solution. The solution is now cooled with ice and diazotized by the addition of 7 parts sodium nitrite in 10% solution followed by 70 parts muriatic acid (commercial hydrochloric acid). The diazo compound is now run into a solution of 31.5 parts 2-phenylamino-5-naphthol-7-sulfonic acid in 50 parts water and 100 parts pyridine. After the coupling is finished the dyestuff is salted out by the addition of 75 parts common salt, filtered off, washed with a saturated sodium chloride solution and dried. It is in form of its sodium salt a dark powder, soluble in water with a greenish-blue color, soluble in concentrated sulfuric acid with a blue color. It has in a free state most probably the formula

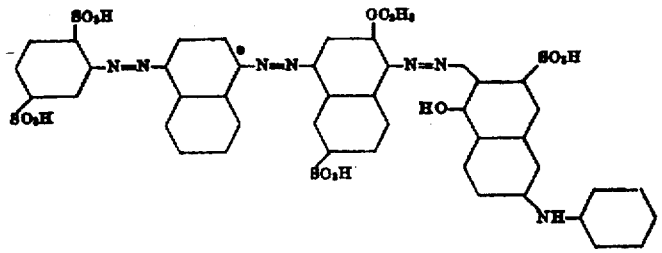

It yields by reduction with stannous chloride and hydrochloric acid aniline-3-6-disulfonic acid, 1-4-naphthylene diamine, 1-4-diamino-2-ethoxynaphthalene-6-sulfonic acid and 2-phenylamino-6-amino-5-naphthol-7-sulfonic acid.

It dyes cotton a very clear, greenish-blue shade of superior light fastness.

Other dyestuffs of this same type are similarly obtained by combining diazo compounds of aryl-azo-aryl-azo-1-2-aminonaphtholether sulfonic acids with 2-5-7-aminonaphtholsulfonic acids in presence of substantial amounts of tertiary amines, particularly pyridine.

The dyestuff from aniline-2-4-disulfonic acid + alpha naphthylamine + 1-2-amino-naphtholethylether-6-sulfonic acid + 2-phenylamino-5-naphthol-7-sulfonic acid dyes cotton greenish blue shades. It can be represented by the formula

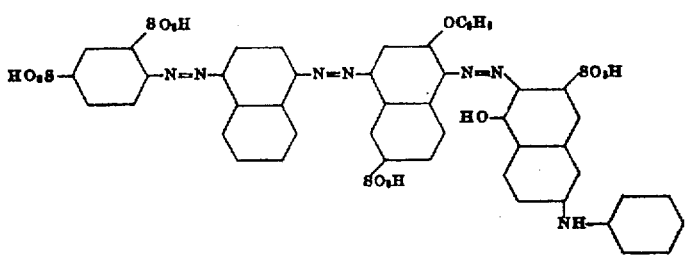

The dyestuff from aniline-3-6-disulfonic acid + 1-naphthylamine-7-sulfonic acid + -1-amino-2-naphtholethylether-6-sulfonic acid + 2-phenylamino-5-naphthol-7-sulfonic acid having most probably the formula

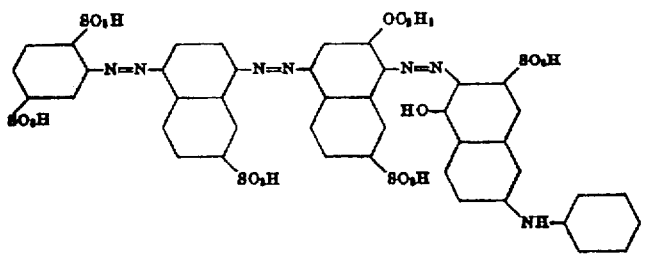

dyes cotton greenish blue shades.

The dyestuff from o-toluidine disulfonic acid + alphanaphthylamine + 1-amino-2-naphtholethylether-6-sulfonic acid + 2-phenylamino-5-naphthol-7-sulfonic acid of the formula

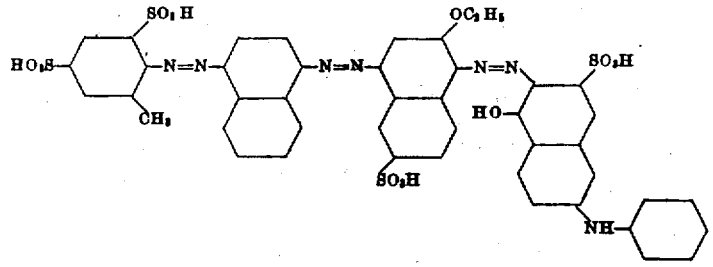

dyes cotton greenish blue shades.

The dyestuff from dinitrodiphenylamine-o-sulfonic acid + 1-naphthylamine-7-sulfonic acid + 1-amino-2-naphtholethylether-6-sulfonic acid + 2-phenylamino-5-naphthol-7-sulfonic acid, dyeing cotton bluish green shades, has most probably the formula

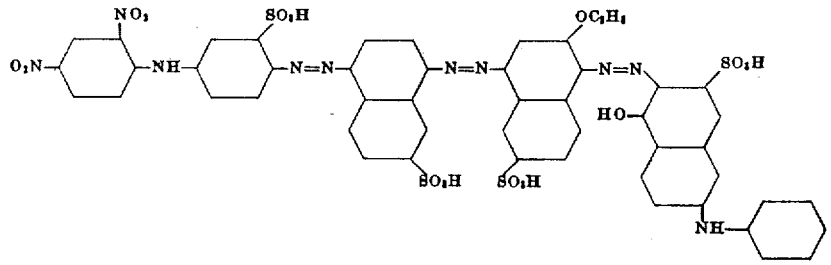

I claim:—

1. In processes of producing trisazo dyestuffs containing 1-2-aminonaphtholether-6-sulfonic acid as third component and a 2-amino-5-naphthol-7-sulfonic acid compound as end component the steps comprising adding substantial amounts of a pyridine base to the water solution of an aryl-azo-aryl-azo-1-diazo-2-naphtholether-6-sulfonic acid, coupling the diazo in this solution with a 2-amino-5-naphthol-7-sulfonic acid compound and recovering the trisazo dyestuff produced.

2. In processes of producing trisazo dyestuffs containing 1-2-aminonaphtholether-6-sulfonic acid as third component and 2-arylamino-5-naphthol-7-sulfonic acid as end component the steps comprising coupling an aryl-azo-aryl-azo-1-diazo-2-naphtholether-6-amino-5-naphthol-7-sulfonic acid compound sulfonic acid with a 2-arylamino-5-naphthol-7-sulfonic acid in presence of amounts of pyridine in excess of those equivalent to the free acidity of the reaction mass.

3. In the process of producing 3-6-disulfobenzene-1-azo-4-naphthalene-1-azo-4-naphthalene-2-ethoxy-6-sulfo-1-azo-6-naphthalene-2-phenylamino-5-hydroxy-7-sulfonic acid of the probable formula

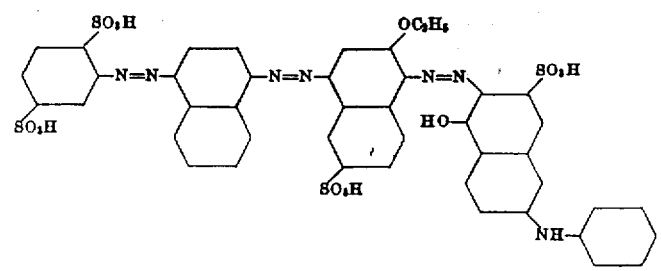

the steps comprising coupling 3-6-disulfobenzene-1-azo-4-naphthalene-1-azo-4-naphthalene-1-diazo-2-ethoxy-6-sulfonic acid with 2-phenylamino-5-naphthol-7-sulfonic acid in presence of substantial amounts of pyridine.

4. As new products trisazo dyestuffs of the general formula

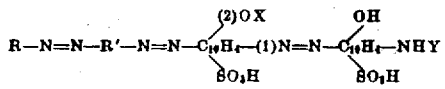

in which R and R' are the radicles of aromatic amines or amino sulfonic acids, X an alkyl and Y hydrogen or an aryl radicle, which dyestuffs are in form of their alkali metal salts dark powders, soluble in water with from blue to green colors, soluble in concentrated sulfuric acid with blue color, dyeing cotton exceedingly bright green to blue shades of superior light fastness and yielding by reduction with stannous chloride and hydrochloric acid an aromatic amine, an aromatic diamine, a 1-4-diamino-2-naphtholether-sulfonic acid and a diaminonapthol sulfonic acid compound.

5. As new products trisazo dyestuffs of the general formula

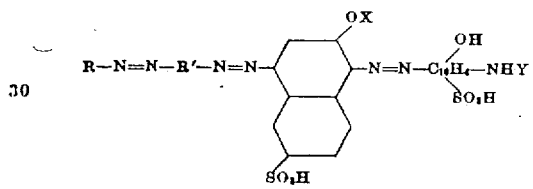

in which R and R' are the radicles of aromatic amines or aminosulfonic acids, X an alkyl and Y hydrogen or an aryl radicle, which dyestuffs are in form of their alkali metal salts dark powders soluble in water with from blue to green colors, soluble in concentrated sulfuric acid with blue color, dyeing cotton from blue to green exceedingly bright shades of superior light fastness and yielding by reduction with stannous chloride and hydrochloric acid an aromatic amine, an aromatic diamine, a 1-4-diamino-2-naphtolether-6-sulfonic acid and a diamino naphthol acid compound.

6. As new products triasazo dyestuffs of the general formula

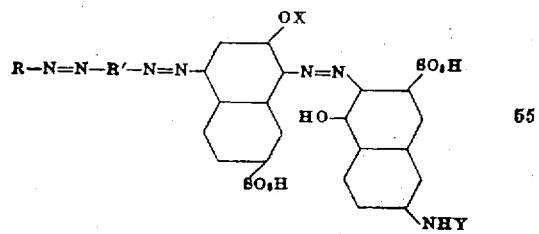

in which R and R' are the radicles of aromatic amines or amino sulfonic acid, X an alkyl and Y hydrogen or an aryl radicle, which dyestuffs are in form of their alkali metal salts dark powders soluble in water with from blue to green colors, soluble in concentracted sulfuric acid with blue color, dyeing cotton from blue to green exceedingly bright shades of superior light fastness and yielding by reduction with stannous chloride and hydrochloric acid an aromatic amine, an aromatic diamine, a 1-4-diamino-2-naphtholether-6-sulfonic acid and a 2-6-diamino-5-naphthol-7-sulfonic acid compound.

7. As a new product the trisazo dyestuff having the formula

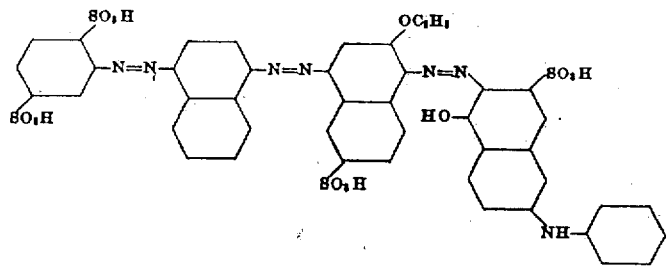

which in form of its alkali metal salt is a dark powder, soluble in water with a greenish blue color, soluble in concentrated sulfuric acid with a blue color, dyeing cotton exceedingly bright and fast shades and yielding by reduction with stannous chloride and hydrochloric acid aniline-3-6-disulfonic acid, 1-4-naphthylene-diamine, 1-4-diamino-2-naphtholethylether-6-sulfonic acid and 6-amino-2-phenylamino-5-naphthol-7-sulfonic acid.

In testimony whereof I have hereunto set my hand.

HUGO SCHWEITZER.

lene-1-diazo-2-ethoxy-6-sulfonic acid with 2-phenylamino-5-naphthol-7-sulfonic acid in presence of substantial amounts of pyridine.

4. As new products trisazo dyestuffs of the general formula

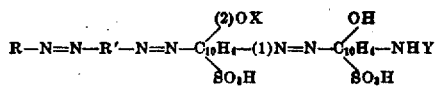

in which R and R' are the radicles of aromatic amines or amino sulfonic acids, X an alkyl and Y hydrogen or an aryl radicle, which dyestuffs are in form of their alkali metal salts dark powders, soluble in water with from blue to green colors, soluble in concentrated sulfuric acid with blue color, dyeing cotton exceedingly bright green to blue shades of superior light fastness and yielding by reduction with stannous chloride and hydrochloric acid an aromatic amine, an aromatic diamine, a 1-4-diamino-2-naphtholether-sulfonic acid and a diamino-napthol sulfonic acid compound.

5. As new products trisazo dyestuffs of the general formula

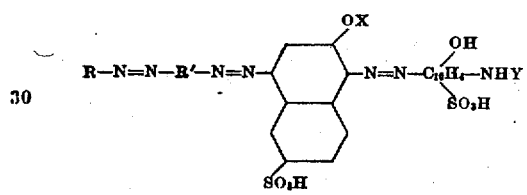

in which R and R' are the radicles of aromatic amines or aminosulfonic acids, X an alkyl and Y hydrogen or an aryl radicle, which dyestuffs are in form of their alkali metal salts dark powders soluble in water with from blue to green colors, soluble in concentrated sulfuric acid with blue color, dyeing cotton from blue to green exceedingly bright shades of superior light fastness and yielding by reduction with stannous chloride and hydrochloride acid an aromatic amine, an aromatic diamine, a 1-4-diamino-2-naphtolether-6-sulfonic acid and a diamino-naphthol acid compound.

6. As new products trisazo dyestuffs of the general formula

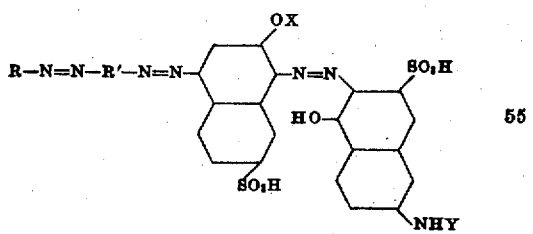

in which R and R' are the radicles of aromatic amines or amino sulfonic acid, X an alkyl and Y hydrogen or an aryl radicle, which dyestuffs are in form of their alkali metal salts dark powders soluble in water with from blue to green colors, soluble in concentrated sulfuric acid with blue color, dyeing cotton from blue to green exceedingly bright shades of superior light fastness and yielding by reduction with stannous chloride and hydrochloric acid an aromatic amine, an aromatic diamine, a 1-4-diamino-2-naphtholether-6-sulfonic acid and a 2-6-diamino-5-naphthol-7-sulfonic acid compound.

7. As a new product the trisazo dyestuff having the formula

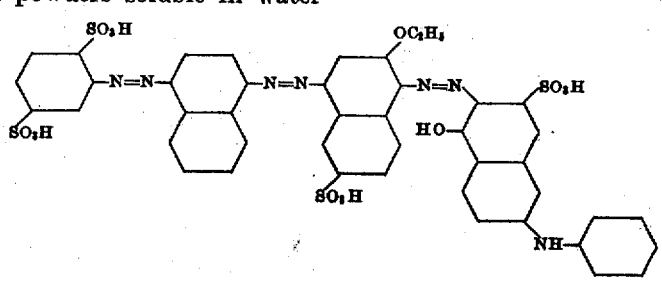

which in form of its alkali metal salt is a dark powder, soluble in water with a greenish blue color, soluble in concentrated sulfuric acid with a blue color, dyeing cotton exceedingly bright and fast shades and yielding by reduction with stannous chloride and hydrochloric acid aniline-3-6-disulfonic acid, 1-4-naphthylene-diamine, 1-4-diamino-2-naphtholethylether-6-sulfonic acid and 6-amino-2-phenylamino-5-naphthol-7-sulfonic acid.

In testimony whereof I have hereunto set my hand.

HUGO SCHWEITZER.

Certificate of Correction.

It is hereby certified that in Letters Patent No. 1,602,991, granted October 12, 1926, upon the application of Hugo Schweitzer, of Wiesdorf, near Cologne, Germany, for an improvement in "Trisazo Dyestuffs," an error appears in the printed specification requiring correction as follows: Page 3, line 34, claim 2, strike out the phrase " amino-5-naphthol-7-sulfonic acid compound "; and that the said Letters Patent should be read with this correction therein that the same may conform to the record of the case in the Patent Office.

Signed and sealed this 9th day of November, A. D. 1926.

[SEAL.]

WM. A. KINNAN,
*Acting Commissioner of Patents.*

Certificate of Correction.

It is hereby certified that in Letters Patent No. 1,602,991, granted October 12, 1926, upon the application of Hugo Schweitzer, of Wiesdorf, near Cologne, Germany, for an improvement in "Trisazo Dyestuffs," an error appears in the printed specification requiring correction as follows: Page 3, line 34, claim 2, strike out the phrase " amino-5-naphthol-7-sulfonic acid compound"; and that the said Letters Patent should be read with this correction therein that the same may conform to the record of the case in the Patent Office.

Signed and sealed this 9th day of November, A. D. 1926.

[SEAL.]
WM. A. KINNAN,
*Acting Commissioner of Patents.*